United States Patent

[11] 3,624,347

[72] Inventors Harold E. Todd Anderson;
Lloyd T. Fuqua, Fortville, both of Ind.
[21] Appl. No. 19,943
[22] Filed Mar. 16, 1970
[45] Patented Nov. 30, 1971
[73] Assignee General Motors Corporation
Detroit, Mich.

[54] HEATED REARVIEW MIRROR ASSEMBLY
1 Claim, 4 Drawing Figs.
[52] U.S. Cl. .................................................. 219/219,
219/203, 219/543, 248/481, 338/308, 350/61
[51] Int. Cl. .................................................. H05b 3/22,
B60r 1/06
[50] Field of Search ........................................ 219/219,
543, 203; 338/306–309; 350/61, 288, 307;
248/481

[56] References Cited
UNITED STATES PATENTS

| | | | |
|---|---|---|---|
| 540,073 | 5/1895 | Reed ............................ | 338/258 |
| 2,497,507 | 2/1950 | McMaster ..................... | 338/308 X |
| 2,791,939 | 5/1957 | Malachowski................. | 350/61 |
| 3,052,787 | 9/1962 | Williams........................ | 350/61 X |
| 3,442,151 | 5/1969 | Brawner et al................. | 350/307 X |

FOREIGN PATENTS

| | | | |
|---|---|---|---|
| 1,189,667 | 3/1965 | Germany ..................... | 219/219 |

OTHER REFERENCES

" Pyrex Brand E–C Heated Mirror," Corning Glass Works Product Information Bulletin IC-7, published Nov. 2, 1959 by the Industrial Components Sales Dept. of Corning Glass Works, Corning, N.Y. 4 pp. Copy in 219/219

*Primary Examiner*—A. Bartis
*Attorneys*—J. L. Carpenter, E. J. Biskup and Peter D. Sachtjen ABSTRACT: A rearview mirror assembly for a motor vehicle wherein a mirror element is provided with a nontransmissive, electrically conductive reflective coating across the exterior viewing surface. Elongated contacts extending along the top and bottom edges of the coating provide a uniform current path across the coating when an electrical potential is applied thereacross to directly resistance heat the coating. The low-thermal conductivity of the mirror element acts as an insulating barrier which serves to retain heat at the coating, thereby improving the thermal efficiency of the assembly. A backing plate, adhesively attached the other surface of the mirror element, mounts the mirror element on a ball stud located within the cavity of a mirror support housing on the exterior of the vehicle, thereby permitting adjustable universal movement of the mirror element about the ball stud within confines of the cavity. A manual control switch is provided for selectively applying heating current to the coating.

PATENTED NOV 30 1971

INVENTORS
Harold E. Todd, &
Lloyd T. Fuqua
BY Peter D. Sachtjen
ATTORNEY

INVENTORS
Harold E. Todd, &
BY Lloyd J. Fuqua
Peter O. Sachtjen
ATTORNEY

HEATED REARVIEW MIRROR ASSEMBLY

The present invention relates to a heated mirror and, in particular, to an exterior rear-view mirror assembly for a motor vehicle which is resistance heated to remove moisture accumulations on the mirror viewing surface.

When the outside temperature drops below the dew point, the viewing surface of the outside rearview mirror is susceptable to clouding, frosting, fogging, or icing conditions. Numerous prior approaches for remotely remedying such conditions have suggested raising the temperature of the mirror element by such expediencies as radiant heating or convection currents to remove such accumulations. In one arrangement, heated air is directed over the viewing surface while in another, a resistance wire is used to raise the temperature of the assembly above the prevailing dew point. However, neither of these arrangements is altogether satisfactory. For instance, the convection method requires a heat source, such as the engine heater system, which itself must be independently warmed before performing an auxiliary function. Thus, the time to remove moisture accumulations encountered at vehicle start up is excessively long. The radiant method using a heating coil behind the mirror glass is similarly deficient in that the low-thermal conductivity glass precludes rapid heating of the viewing surface. Moreover, the localized heating of the coil creates severe internal stresses in the mirror glass which can cause cracking under low-temperature conditions.

An improved heated structure overcoming some of the above problems is disclosed in Williams 3,052,787 assigned to the assignee of the present invention, wherein a circular heating element fixed to the rear surface of the mirror element is heated to raise the temperature of the mirror glass above the dew point. However, this arrangement, while more uniformly distributing the applied heat, still requires considerable time to transfer heat through the glass and also creates temperature gradients in the elements which contribute to mirror element cracking.

The present invention, on the other hand, provides a simplified mirror construction which quickly reaches an operating temperature by directly heating the surface on which the moisture formations have accumulated. Generally, this is accomplished by using a mirror element of the first surface type wherein an electrically conductive coating is deposited across the exterior viewing surface. By use of elongated electrical contacts extending along the top and bottom edges of the coating, a uniform current path is provided across the reflective coating when a potential is applied thereacross to directly resistance heat the coating. As distinguished from the above-mentioned structures, the low conductivity of the mirror element acts as an insulating barrier which serves to retain heat at the coating thereby greatly improving the thermal efficiency of the assembly. In this manner, the coating will rapidly attain an operating temperature above the prevailing dew point. Moreover, the uniform heating provided by use of parallelly spaced contacts effectively prevents any excessive temperature gradients which could induce breakage of the mirror glass.

In view of the above, an object of the present invention is to provide an improved rearview mirror assembly wherein a reflecting coating is directly resistance heated to remove moisture accumulations on the mirror-viewing surface.

Another object of the present invention is to provide a resistance heated rearview mirror assembly wherein a mirror element includes an electrically conductive reflective coating on the exterior surface thereof to which a uniformly distributed heating current is applied thereby raising the temperature of the coating sufficiently to remove and prevent moisture accumulations.

A further object of the present invention is to provide a heated mirror assembly for a motor vehicle wherein a mirror element having a front-reflecting surface coated with a nontransmissive, electrically conductive material includes elongated current distributing contacts along the marginal edges thereof which establish a uniform current path across the mirror viewing surface such that when a potential is applied between the contacts, the reflecting surface is uniformly and directly heated to a temperature above the prevailing dew point thereby eliminating moisture tending to accumulate thereon during inclement weather.

These and other objects will be apparent to one skilled in the art upon reading the following detailed description, reference being made to the accompanying drawings in which.

Figure 1:
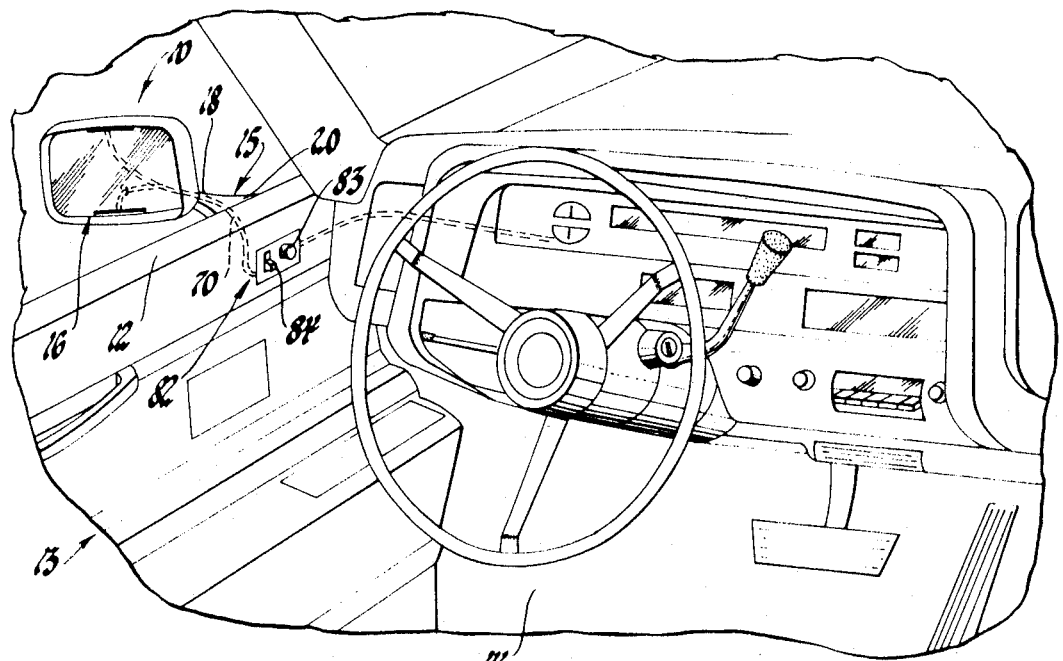
FIG. 1 is a perspective view of a heated rearview mirror assembly, made in accordance with the present invention, mounted on a motor vehicle.
Figure 2:
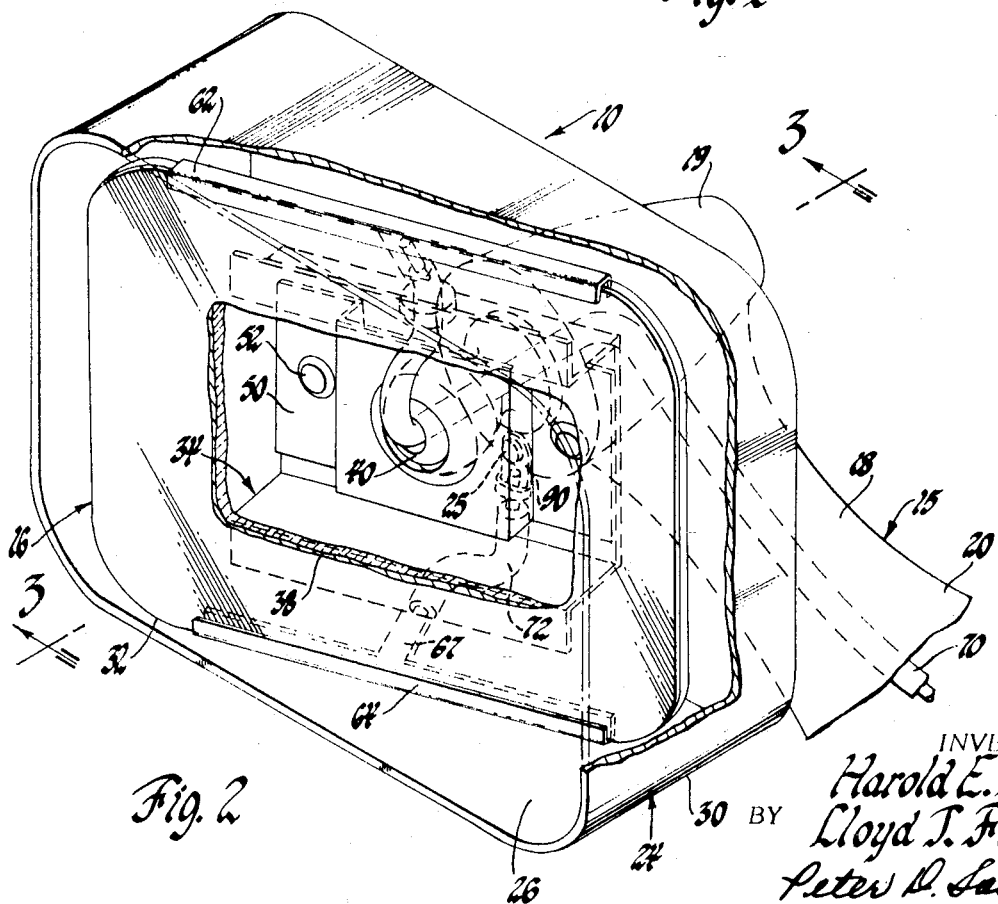
FIG. 2 is a partially sectional perspective view of the rearview mirror assembly shown in FIG. 1.
Figures 3, 4:
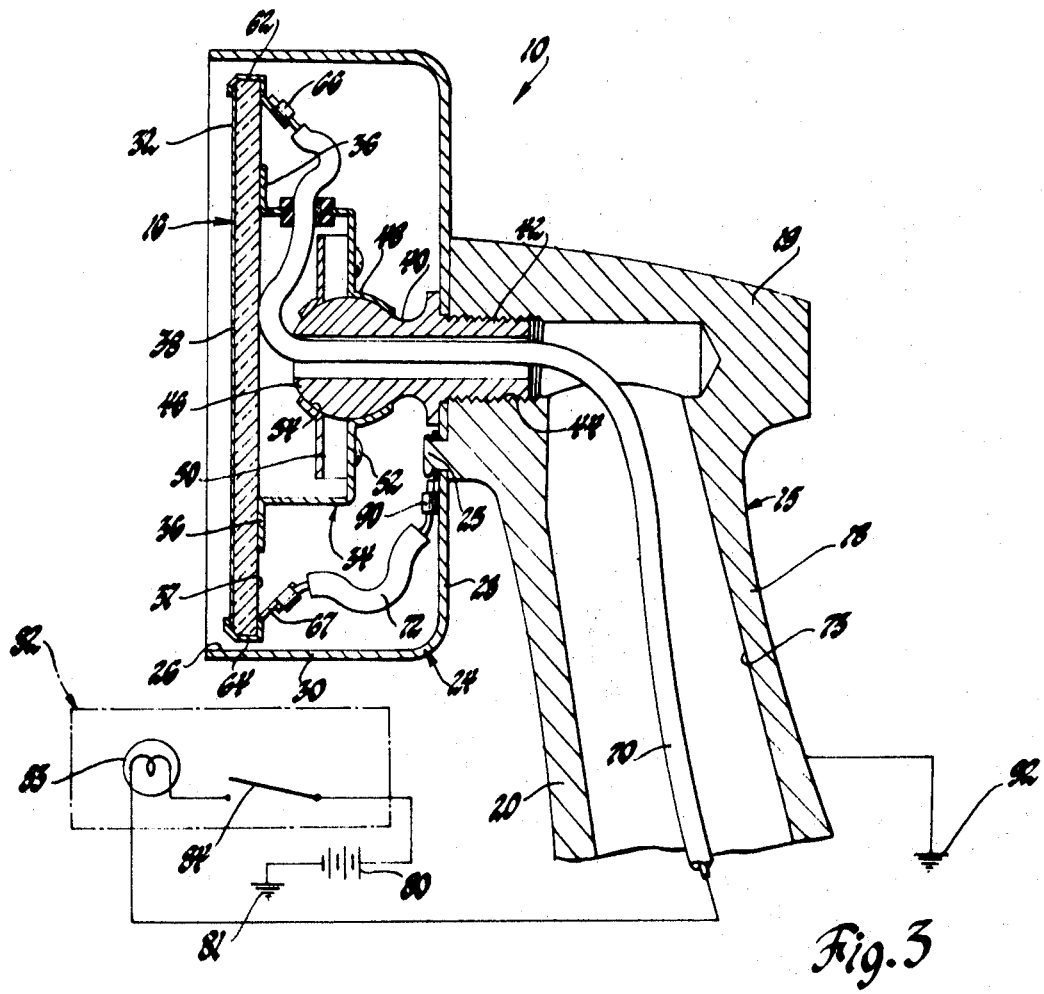
FIG. 3 is a view taken along line 3—3 of FIG. 2.
FIG. 4 is an enlarged view showing the electrical connection to the reflective coating.

Referring to the drawings, there is shown a heated rearview mirror assembly 10, made in accordance with the present invention, which is mounted on a door 12 of a motor vehicle 13 exteriorly of the passenger compartment 14. The mirror assembly 10 generally comprises a mirror support 15 carrying a mirror unit 16. The mirror support 15 includes an inclined vertical support arm 18 having an enlarged head section 19 at its upper end and a base 20 at its lower end which is adapted to be conventionally mounted on the door 12. A thin wall housing 24 is attached to the head section 19 by a ball stud 40. A generally rectangular mirror cavity 26 is formed in the housing 24, as defined by the base wall 28 and a peripheral rim 30. A rivet 25 rearwardly projects into the cavity 26 through an opening in the base wall 28.

The mirror unit 16 generally includes a mirror element 32 formed from a suitable material, such as glass or plastic, and a backing plate 34 having upper and lower flanges 36 adhesively or otherwise attached to the rear surface 37 of the mirror element 32.

The mirror element 32 is generally rectangular in shape and is commonly referred to as a first-surface type mirror in that a suitable reflective metallic coating 38 is placed on the front or exterior surface thereof. In the preferred embodiment, the reflective coating 38 is formed by chrome deposition and establishes a nontransmissive, electrically conductive reflective coating over the viewing surface of the mirror element 32.

A ball stud 40 includes a threaded shank 42 which is received within a complementally threaded aperture 44 formed in the head section 19 and serves to clamp the housing 24 against the head section 19. The ball stud 40 includes a spherical ball end 46 which is embraced on its rear portion by an apertured central socket 48 on the backing plate 34. A mounting strap 50, secured to backing plate 34 by rivets 52, includes a socket 54 which embraces the front portion of the ball end 46. In this manner, the mirror element 32 is universally supported on the ball stud 40 for adjustable pivotal movement within the confines of the cavity 26.

A pair of elongated current distributor contacts 62 and 64 are suitably secured, as by crimping, to the top and bottom edges of the mirror element 32 so as to be in electrical contact with the reflective coating 38. The contacts 62 and 64 include central rearwardly extending terminals 66 and 67, respectively. Inasmuch as the electrical contact between the coating 60 and the contacts 62 and 64 extends substantially transversely across the mirror element 32, when a potential is established therebetween, a uniform current path will be established throughout the coating and will thereby uniformly heat and raise the temperature of the coating 38 in a manner to be described below.

The heating circuit for the coating 60 generally includes an inlet conductor 70 and a ground conductor 72 which are connected to the terminals 66 and 67. The inlet conductor 70 extends axially through the ball stud 40 and downwardly through a core 73 in the support arm 18. The other end of the conductor 70 is suitably connected to a power source 80, such as the vehicle battery, which is connected to a ground 81. A control unit 82 is mounted in the passenger compartment on the interior surface of the door 12 and comprises an indicating light 83 and a control switch 84, both of which are connected in series with the power source 80. When the control switch 84 is closed, the light 83 will be illuminated thereby indicating that a heating current is being applied to the coating 38. The ground conductor 72 includes a terminal end 90 which is attached to the rivet 25 thereby establishing a ground circuit through the head section 19 and the support arm 18 to a ground 92.

When a rearview mirror assembly 10, of the type described above, is operated in environments where the prevailing outside temperature is below the dew point, moisture accumulations in the form of fog, frost, or ice can be deposited on the viewing surface of the mirror element 32. The removal of such moisture accumulations is conveniently accomplished by closing the control switch 84 whereupon a potential is applied between the contacts 62 and 64 and a heating current is uniformly distributed throughout the coating 38. When the viewing surface is clean, the heating cycle is stopped by opening the switch 84. The heating cycle may be maintained, however, to prevent moisture formation if the motor vehicle is being operated in rain or snow.

Because of the different rates of thermal expansion for the coating 38 and the mirror element 32, it is desirable to limit the power applied to the mirror unit to thereby avoid cracking of the viewing surface. In this respect, it has been found that limiting the input to less than 0.7 watts per square inch will avoid the aforementioned breakage problem while permitting rapid resistance heating of the coating 38 to above the dew point temperature. Additionally, the efficiency of the above-described mirror assembly is increased by the low thermal conductivity of the mirror element 32, which acts as an insulating barrier to retain the heat at the coating 38.

Heated rearview mirror assemblies, made in accordance with the above description, have been successfully tested and found to remove all moisture accumulations within 2 to 5 minutes under environmental conditions approaching 0° F. when operated in accordance with the following dimensions:

| | |
|---|---|
| Material of the coating 38 | Chrome |
| Thickness of the coating 38 | 0.001 inch |
| Size of the mirror element 32 | 3 inches × 5 inches |
| Voltage applied across the conductors 62 and 64 | 12 to 15 volts |
| Heating current | 1 ampere |
| Heating input to the coating 38 | Less than 0.7 watts per square inch |

Although only one form of this invention has been shown and described, other forms will be readily apparent to those skilled in the art. Therefore, it is not intended to limit the scope of this invention by the embodiment selected for the purpose of this disclosure, but only by the claims which follow.

What is claimed is:

1. A resistance heated rear view mirror assembly for a motor vehicle, comprising: an electrically conductive motor support adapted to be mounted exterior of the vehicle in grounding relationship therewith; a housing on said mirror support having a generally rearwardly opening cavity, a ball stud connected to said mirror support and disposed interior of said cavity; a generally rectangular mirror element having a low thermal and electrical conductivity; a backing plate universally frictionally supported on said ball stud said backing plate being directly adhesively attached to the forwardly facing surface of said mirror element for thereby electrically insulating the latter from said mirror support while permitting adjustable universal movement of said mirror element about said ball stud within the confines of said cavity; a nontransmissive, electrically conductive reflective coating on the rearwardly facing exterior surface of said mirror element for establishing a rearward viewing surface, said coating being exposed to moisture in varying forms during inclement weather, switch means disposed interior of the vehicle; an elongated first current distributing contact secured along one edge of said mirror element in electrical contact with said coating; first conductor means electrically connecting said first current distributing contact in series with said power source and said switch means; and an elongated second current distributing contact secured along the opposite edge of said mirror element in electrical contact with said coating; second conductor means electrically connecting said second current distributing contact in electrical grounding relationship with said mirror support thereby establishing a uniform current path between said contacts and throughout the major portion of the viewing surface, whereby closing said switch means passes a heating current through said reflective coating to rapidly raise the temperature of the latter above the prevailing dew point temperature thereby removing any moisture accumulating on the coating, the low-thermal conductivity of said mirror element serving to retain heat at the coating to improve the thermal efficiency of the mirror assembly.

* * * * *